United States Patent [19]

Pruvot

[11] 3,799,033
[45] Mar. 26, 1974

[54] OUTPUT REVERSING VALVES WITH BY-PASS POSITION

[75] Inventor: Francois C. Pruvot, Billancourt, France

[73] Assignee: Regie Nationale Des Usiness Renault, Billancourt, France

[22] Filed: Dec. 20, 1971

[21] Appl. No.: 209,590

[30] Foreign Application Priority Data
Dec. 21, 1970  France.......................70.45966

[52] U.S. Cl........................ 91/482, 91/485, 91/489, 91/499
[51] Int. Cl............................................. F01b 3/10
[58] Field of Search ............. 91/474, 482, 483, 485, 91/489, 486, 487

[56] References Cited
UNITED STATES PATENTS
3,230,894  1/1966  Badenoch et al.................. 91/482 X
3,616,727  11/1971  Suzuki................... 91/499

FOREIGN PATENTS OR APPLICATIONS
240,799  3/1960  Australia............................. 91/482

Primary Examiner—C. J. Husar
Assistant Examiner—Leonard Smith
Attorney, Agent, or Firm—Stevens, Davis, Miller & Mosher

[57] ABSTRACT

An output reversing valve having a by-pass position for fluid-pressure operated devices has a switching member comprising at least two closing members angularly shifted in relation to the pair of diametrally opposed fluid passage orifices, the closing members and passage orifices being shaped to conform to the first and second pairs of primary parts of the valve body. The first and second pairs of primary ports are connected to two pairs of secondary ports of the valve body. This valve is applicable notably to the field of hydrostatic transmissions of vehicles.

6 Claims, 5 Drawing Figures

OUTPUT REVERSING VALVES WITH BY-PASS POSITION

The present invention relates in general to hydraulic output reversing valves having a by-pass position, such valves being advantageously used notably in the field of hydrostatic transmissions for propelling vehicles and equipping certain machines.

Slide valves are known wherein the spool is adapted to occupy three positions in a valve body provided with two fluid inlet ports and two fluid outlet ports in order to obtain a reversal in the fluid output and also a by-pass position.

In these valves :

in a first position the spool interconnects each one of the pair of input ports with the corresponding pair of output ports, in a second spool position the cylindrical spool portions of the valve, which are axially shorter than the grooves thereof, provide a hydraulic connection between the various ports : this is the by-pass position ;

in a third position the spool communicates one input port with an output port through a passage formed in the valve body. Thus, hydraulic connections inverted in relation to the hydraulic connections obtained in the first position of the valve spool are obtained.

The internal losses of pressure are rather considerable in valves of this type, due to the changes produced in the cross-sectional area of the passages and in the direction of flow of the hydraulic fluid.

It is also observed that in these valves internal leakages take place between the various ports, and the smaller the spool travel, the greater these leakages. Therefore, to reduce these internal leakages the clearance existing between the spool and the bore of the valve body must be reduced to the minimum possible value.

To obtain this function, i.e. reversing the fluid output and obtaining a by-pass position, pumps having the output reversing characteristic are also used, such as axial-flow, variable volumetric-capacity pumps (with variable-inclination swash plate) or piston pumps having a broken axis, are used, these various pumps being completed by a by-pass valve. However, this solution although very popular nowadays since it permits the elimination of a number of defects among those listed hereinabove, requires the use of special output-reversing pumps and elaborate means for controlling their cylinder capacity. Moreover, if in the inoperative condition of the vehicle or machine utilizing this pump the latter must have a well-defined cylinder or volumetric capacity (i.e. usually zero capacity in the inoperative condition in order to permit the re-starting of the driving thermal engine), the device for restoring this zero initial capacity must be doubled.

Rotary distributor valves are also known, wherein the hydraulic circuits are switched by means of a rotary valve body formed with passages as required for performing the various valve functions. The hydraulic connection between the rotary body and the valve body proper is obtained with the assistance of flat seals or gaskets preventing any leakage. The shape of these valves is such that several changes of direction and cross-sectional area of the ducts and passages are necessary. Therefore, these valves are objectionable on account of their relatively high losses of internal pressure. Moreover, their principle of operation is such that it precludes any alignment between the inlet and outlet ports.

It is the primary object of this invention to provide :

a valve capable of operating with negligible internal losses of pressure, at least in one valve position, a valve of reduced over-all dimensions, having negligible internal leakages, a valve characterized by a special construction and adapted to be fitted within the cover of a hydraulic pump or motor.

This output reversing valve with by-pass position, which comprises a cylindrical switching member having two fluid passage orifices, said member being rotatably mounted between first and second flat faces of a valve body, and having a first pair of diametrally opposed primary ports comprising a primary inlet port and a primary outlet port formed in said valve body and opening into the plane of said first flat face, and a second pair of diametrally opposed primary ports formed in the valve body and opening into the plane of the second flat face, is characterized in that :

a. The switching member comprises at least two closing elements shifted angularly in relation to said diametrally opposed fluid passage orifices ;

b. Said closing elements and passage orifices are shaped to conform to the first and second pairs of diametrally opposed primary ports of the valve body ; and c. The first and second pairs of primary ports are connected to two pairs of second ports opening into the planes of the first and second faces of said valve body, whereby the first pair of secondary ports and the second pair of secondary ports are diametrally opposed and shifted angularly, respectively, in two different directions in relation to the first pair of primary ports and to the second pair of primary ports.

In the valve thus constructed the switching member comprising two diametrally opposed passage orifices and having cross-sectional areas substantially equal to the cross-sectional areas of the valve body orifices, is adapted to :

either connect directly, without any output deviation, a primary port to a second port while closing the other primary ports, or connect a first primary port with either of the pair of second primary ports when the angular position of said switching member is modified.

Other details and features characterizing the present invention will appear as the following description proceeds with reference to the attached drawings illustrating diagrammatically by way of example a typical form of embodiment of the invention. In the drawings.

Figure 1:
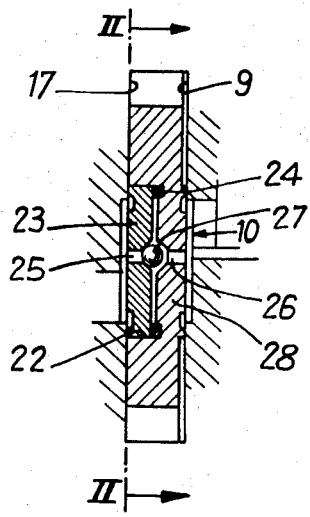
FIG. 1 is a sectional view of the valve of this invention, the section being taken along the line I—I of FIG. 2.
Figure 2:
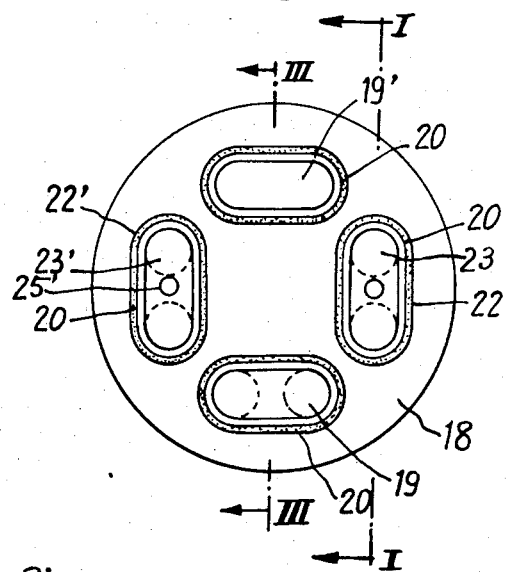
FIG. 2 is a plan view of the valve switching member, as seen in the direction of the arrows II—II of FIG. 1.

Referring first to FIGS. 1 and 2, the valve comprises a switching member 18 in the form of a relatively thin rotary cylinder disposed between two parallel flat faces 9 and 17 of a valve body.

The switching member comprises a pair of fluid passage orifices 19, 19' disposed symmetrically in relation to the axis of rotation of member 18. These orifices 19, 19' open each into one of said faces 9, 17, respectively.

On the other hand, the valve body comprises a first pair of primary fluid orifices 10, 10' opening into the face 9, and a second pair of primary fluid orifices 14, 14' opening into the other face 17.

Secondary orifices are shaped to conform with orifices 10, 10' and 14, 14' respectively, and disposed at diametrally opposed locations on the relevant faces of said switching member.

According to a specific feature characterizing this valve, the secondary orifices 15, 15' formed in the face 9 of the valve body are connected to the first pair of primary orifices and angularly shifted by 90° in relation to the first pair of primary orifices. With the switching member set in the position shown in FIG. 4, the passage 19 provides a direct fluid connection between orifice 10 and orifice 14, and the other passage 19' provides a direct fluid connection between orifice 10' and orifice 14'. The switching member 18 comprises two annular bearing surfaces surrounding each one of the fluid passage orifices 19 and 19' engaging the face 9 of the valve body.

The switching member 18 further comprises flat resilient seals 21, 21' engaging the other face 17 of the valve body and surrounding the fluid passage orifices 19, 19', respectively. These seals are slidably mounted in these orifices.

The switching member 18 is constantly urged against the face 9 of the valve body by the combined action of the internal fluid pressure and of an elastomeric seal 50. In a modified form of embodiment the flat resilient seals 21, 21' may be mounted in back-to-back relationship with the corresponding elastomeric seals 50, and thus urged for resilient engagement with each face of the valve body.

The secondary orifices 15, 15' are connected to the primary orifices 10, 10' via internal ducts formed in the valve body.

The face 17 comprises similarly two secondary orifices 16, 16' shifted by 90° in relation to the primary orifices 14 and 14'. The secondary orifices 16, 16' are connected to the primary orifices 14, 14' via internal ducts formed on the valve body.

Figure 4:
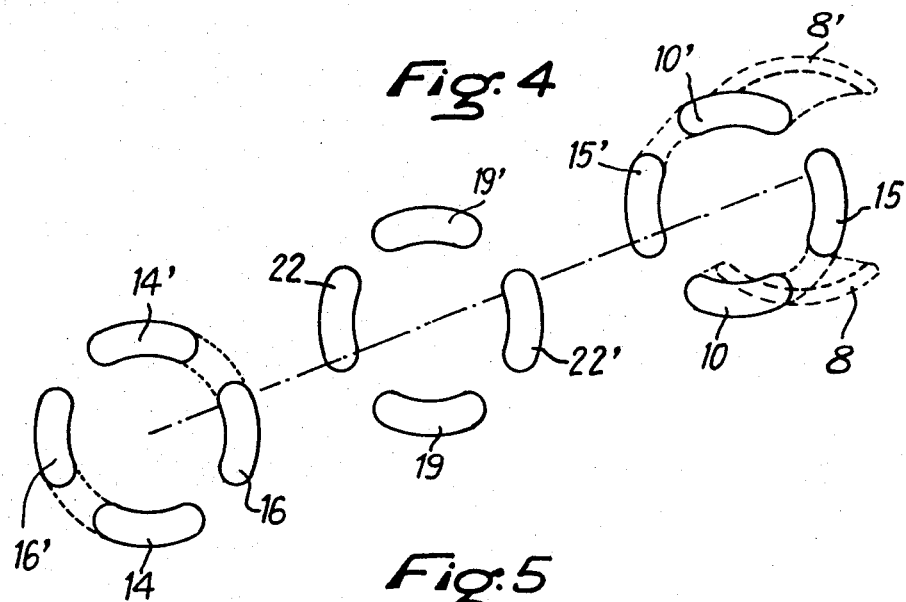
FIG. 4 is a partially exploded view showing the relative positions of the various switching orifices.

According to a specific feature characterizing this valve the secondary orifices are shifted angularly in different directions, as clearly shown in FIG. 4.

If we consider the positions of the various orifices, it will be seen that if the switching member and its orifices 19 and 19' are rotated through 90° in relation to the position illustrated in FIG. 4, the direction of flow of the fluid will be reversed.

In order properly to seal the joint between the cavity receiving the switching member and the primary and secondary orifices 10, 10' ; 15, 15' ; 14, 14' ; 16, 16' which are not communicating with the passage orifices 19 and 19', a pair of recesses 22, 22' are formed in the switching member, these recesses 22, 22' opening into the face 17 of the valve body. Furthermore, these recesses 22, 22' are disposed symmetrically to each other in relation to the axis of rotation of the valve body and shifted by 90° with respect to the passage orifices 19 and 19' provided with said flat seals 21, 21'.

The shape of these recesses, in plan view, is exactly the same as the external contour of the resilient flat seals 21, 21'.

Slidably mounted with minimum play in each one of these recesses 22, 22' are one or two shutter members adapted to close the orifices of the valve body, these members consisting for example of pistons mounted in opposition to whether shown at 23, 23', according as these recesses are blind or open into the face 9 of switching member 18.

The pistons 23, 23' carry on their faces registering with said face 17 an annular flat sealing surface identical with the annular sealing surface 20 of seal 21, 21' and opposed to the annular sealing surface engaging the other face 9 of the valve body. An annular seal 24 fitted in the bottom of each recess 22, 22' constantly urges the pistons 23, 23' for engagement with the face 17 while preventing any fluid leakage between the pistons 23, 23' and the walls of said recesses 22, 22'. The bottom of each recess 22, 22' has an orifice 26 formed therein which opens into the volume left between the bottom of this recess and the pistons 23, 23'. A hole 25 formed in piston 23, 23' opens into the same volume. A valve 27 such as a ball or other valve member is disposed in said volume or between the two pistons disposed in back-to-back relationship for sealing one of the holes 25 or 26 when the other is supplied with fluid under pressure.

Figure 3:
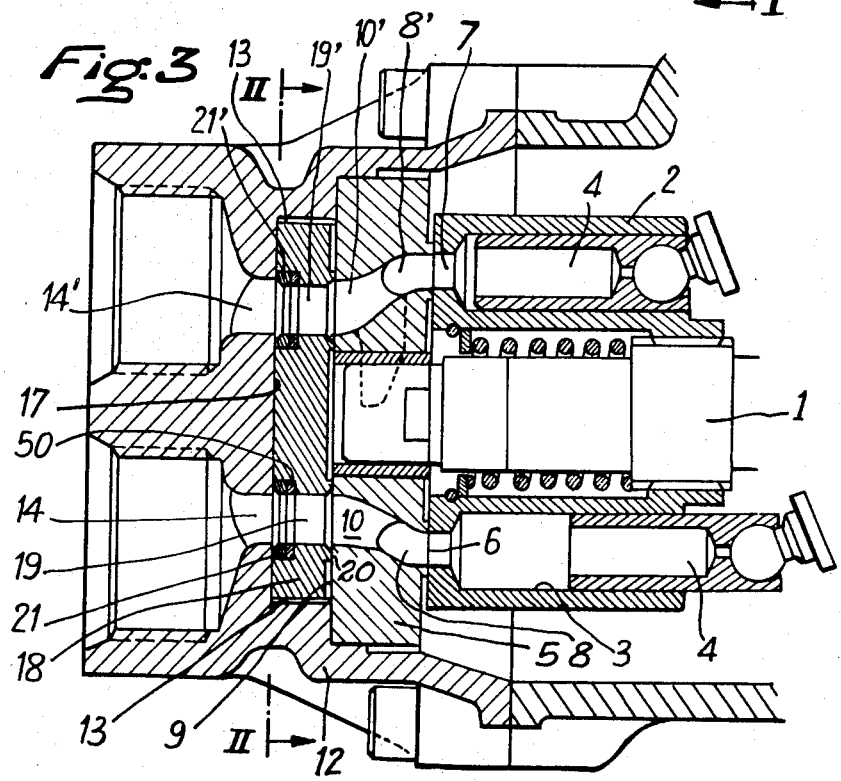
FIG. 3 is a fragmentary longitudinal section showing a pump with a built-in valve.

FIG. 3 illustrates one portion of a barrel-piston pump incorporating the valve according to this invention.

As is well known in the art, this pump comprises a shaft 1 of which one bearing is not shown, for supporting the pump barrel 2. The bores 3 formed in this barrel are parallel to the axis of shaft 1 and have pistons 4 slidably mounted therein. The hydraulic fluid is distributed by means of a distributor plate 5 of which one face 6 co-acts with the orifices 7 at the end of the piston bores. The delivery and suction grooves 8 and 8' of the distributor plate are kidney shaped, as usual, and connected via an internal duct to the primary orifices 10, 10' opening into the face 9 of distributor plate 5. The shape of these orifices 10 and 10' is shown in FIG. 3. The distributor plate 5 is secured to the pump cover 12. Between this cover 12 and the distributor plate 5 a chamber 13 of substantially flattened cylindrical configuration is provided for receiving the above-described valve. The cover 12 further comprises primary orifices 14, 14' disposed in alignment with and having the same dimensions as orifices 10, 10', of distributor plate 5, respectively. Therefore, it is clear that the two orifices 10 and 10' are disposed symmetrically in relation to the pump axis, like the orifices 14 and 14'. Two other secondary orifices 15 and 15' of the same dimensions as orifices 10 and 10' open into the face 9 of distributor plate 5. In the plane of this face 9 the axis of symmetry of orifices 15 and 15' is perpendicular to the axis of symmetry of orifices 10 and 10'. The orifices 15 and 15' are connected to the orifices 10 and 10', respectively, through internal ducts or passages formed in the thickness of the distributor plate 5. Similarly, a pair of secondary orifices 16 and 16' are formed in the face 17 of cover 12. These orifices register with orifices 15 and 15', respectively, with orifice 16' connected to orifice 14 and orifice 16 connected to orifice 14 respectively, through internal ducts or passages. These orifices 14 and 14' are connected in turn to the pump fluid inlet and outlet orifices or ports, respectively. When the valve is in the position shown in FIG. 4, the passage orifice 19 connects orifice 10 to orifice 14, and passage 19' connects orifice 10' to orifice 14'.

Assuming now that the configuration of FIG. 3 is obtained, the hydraulic fluid will flow through passage 19' from orifice 10' to orifice 14', for example under a considerable pressure. Similarly, low-pressure fluid flows from orifice 14 to orifice 10 via passage 19. The orifice 15' connected to orifice 10' is exposed to the high-pressure fluid, like the orifice 16 connected to orifice 14'. Moreover, orifice 15 is connected to the low-pressure orifice 10, and orifice 16' is connected to orifice 14.

It is known that the seals 20 will prevent any leakage from 14 to 10 and from 14' to 10. The high-pressure fluid fed through 15' to the hole 26 of ball valve 27 closes the hole 25. Thus, piston 23 is urged against face 17 while switching member 18 is urged against face 9 (FIG. 1). Similarly, the low-pressure prevailing in orifice 16 propagates via hole 25' of piston 23' diametrally opposed to piston 23. The hole 26' is closed by ball valve 27' and piston 23' is caused to engage face 17. Therefore, to reverse the fluid flow or output, it is only necessary to rotate the switching body 18 through 90°. In the by-pass position, this body is rotated through only 45° so that all the orifices communicate with one another.

Similarly, it will be seen that the orifices 15, 15', 16 and 16' may in certain cases be considerably smaller than the orifices 10, 10', 14 and 14', for in the specific case of a pump operating in a vehicle the speed in reverse gear is considerably lower than in forward gear. Moreover, since the reverse is seldom used, relatively high losses of pressure can be tolerated. Under these conditions it will be seen in FIG. 3 that the pump and its valve can be so designed that in the position of switching body 18 corresponding to the maximum-output operation substantially no change occurs in the direction and cross-sectional area between the orifices 10, 10' and orifices 14, 14'.

Figure 5:
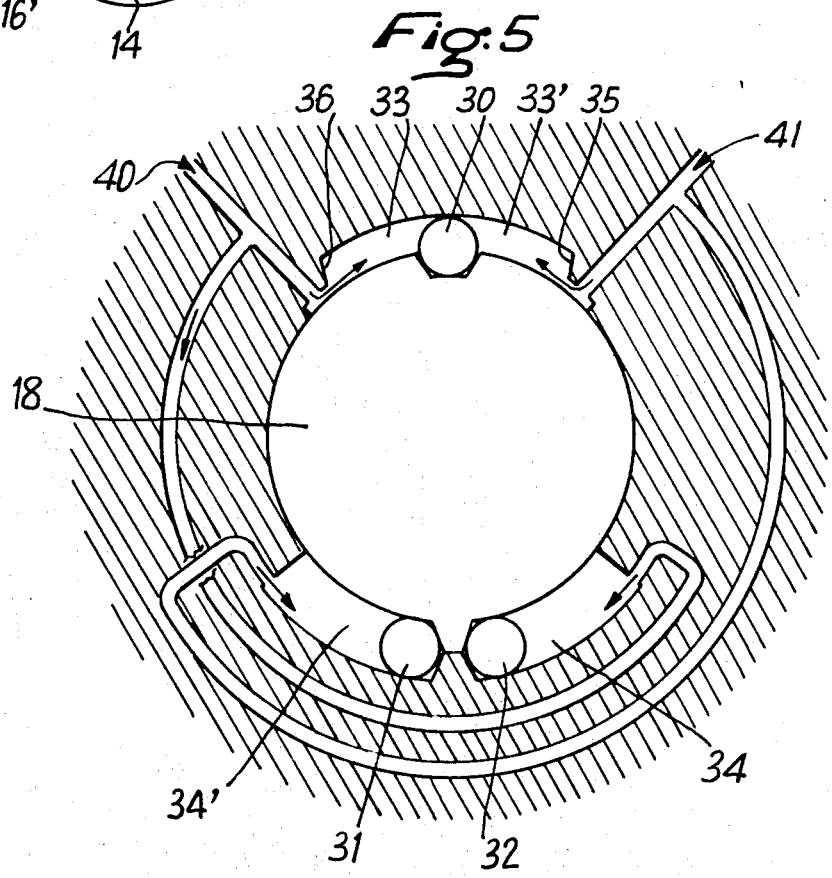
FIG. 5 is a diagrammatic view of a typical form of embodiment of the valve control device.

The rotation of the valve switching member may be controlled in various ways :

1. Mechanically,
   by means of a central rotary shaft, and
   by means of teeth cut in the outer periphery of member 18 and driven through a rack or another toothed wheel ;
2. Hydraulically, FIG. 5 illustrates a possible form of embodiment of such a hydraulic control system. The valve constitutes in this case the rotor of a rotary actuator sealed by valve means which, in this case, consists of rollers 30, 31 and 32 having a height equal to that of chamber 13 and to the thickness of member 18. When the reverse-drive orifice 40 is supplied with hydraulic fluid under pressure, both chambers 33 and 34 are pressurized. When roller 32 is abutting, roller 30 must drive the member 18 until it abuts in turn at 35. Similarly, if the forward drive orifice 41 is supplied, member 18 will rotate until roller 30 abuts at 36. If a by-pass position is desired, it is possible to either insert adequate spring means in chambers 34 and 34' to urge member 18 in this position even in the absence of fluid pressure in the two orifices, or supply both orifices 40 and 41 simultaneously. Then rollers 31 and 32 will set automatically the valve in the position illustrated in FIG. 5.

Although a single form of embodiment of this invention has been described and illustrated herein, it will readily occur to those conversant with the art that various modifications and variations may be brought thereto without departing from the basic principle of the invention as set forth in the appended claims.

What is claimed as new is:

1. Output reversing valve with bypass position, which comprises a cylindrical switching member rotatable between two positions having two diametrally opposed fluid passage orifices, rotatably mounted between first and second flat faces of a valve body, a first pair of diametrally opposed primary ports comprising a primary inlet port and a primary outlet port formed in said valve body and opening into the plane of the first flat face and a second pair of diametrally opposed primary ports also formed in said valve body and opening into the plane of the second flat face, said ports being adapted to be interconnected through the fluid passage orifices formed in said switching member, characterized in that:
   a. the switching member comprises at least two closing members angularly shifted in relation to the diametrally opposed fluid passage orifices,
   b. the closing members and passage orifices are shaped to conform with said first and second pair of diametrally opposed primary ports of said valve body, and
   c. said first and second primary ports of said valve body are connected by pairs to two pairs of secondary ports opening into the plane of the first and second faces of said valve body, a first pair of diametrally opposed secondary ports comprising a secondary inlet port and a secondary outlet port of said valve body being connected to the first paid of primary ports, a second pair of diametrally opposed secondary ports of said valve body being connected to the second pair of primary ports, whereby said first pair of secondary ports and said second pair of secondary ports are diametrally opposed and shifted respectively in two different directions in relation to the first pair of primary ports and to the second pair of primary ports, and in one position of said switching member said first pair of primary ports communicate with said second pair of primary ports, and in the other position of said switching member said pair of first secondary ports communicate with said second pair of secondary ports.

2. Valve according to claim 1, characterized in that said first and second faces of said valve body engage two annular sealing surfaces respectively, shaped and located at the outer periphery of said fluid passage orifices, on one side of said switching member, and provided with resilient flat seals also shaped to conform to said fluid passage orifices, on the opposite side of said switching member.

3. Valve according to claim 2, characterized in that at least one of the two faces of the valve body engages a flat annular sealing surface of the closing members associated with the valve body ports and movable in recesses formed in said switching member, whereby the state of unbalance in the hydraulic forces acting upon said closing members and against the bottom of said recesses urge said closing members against one face of said valve body and said switching member provided with said annular sealing surface registering with said closing member against the other face of said valve body, respectively, for sealing the ports of said body.

4. Valve according to claim 2, characterized in that each face of said switching member is provided with resilient flat seals mounted in back-to-back relationship and in sliding condition in the aforesaid fluid passage orifices of said switching member, whereby said seals engage the faces of said valve body as a consequence of the state of hydraulic unbalance acting on said seals.

5. Valve according to claim 3, characterized in that each closing member comprises a hole opening into the face of said closing member and that said hole is adapted to be closed by a valve member disposed between the bottom of the recesses of said switching member and the face of said closing member which is opposed to the flat sealing face thereof.

6. Valve according to claim 5, characterized in that said closing member is mounted in a blind recess opening into one of the faces of said switching member and that this switching member comprises annular sealing surfaces on its opposite face, said holes formed in said closing member for communicating the volume formed between the bottom of said blind recess and said closing member opening into said annular sealing surfaces, said face and said holes registering with other holes formed in said closing members and being adapted to be closed by the same valve member.

* * * * *